US012406471B2

United States Patent
Sivaraman et al.

(10) Patent No.: US 12,406,471 B2
(45) Date of Patent: *Sep. 2, 2025

(54) USING TEMPORAL FILTERS FOR AUTOMATED REAL-TIME CLASSIFICATION

(71) Applicant: NVIDIA Corporation, Santa Clara, CA (US)

(72) Inventors: Sakthivel Sivaraman, Santa Clara, CA (US); Shagan Sah, Santa Clara, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,646

(22) Filed: Jul. 12, 2024

(65) Prior Publication Data

US 2024/0371136 A1 Nov. 7, 2024

Related U.S. Application Data

(63) Continuation of application No. 18/333,281, filed on Jun. 12, 2023, now Pat. No. 12,073,604, which is a
(Continued)

(51) Int. Cl.
*G06V 10/00* (2022.01)
*G06F 18/20* (2023.01)
(Continued)

(52) U.S. Cl.
CPC ........ *G06V 10/764* (2022.01); *G06F 18/2321* (2023.01); *G06F 18/285* (2023.01);
(Continued)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS 5,666,518 A 9/1997 Jumper
5,909,190 A 6/1999 Lo et al.
(Continued)

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.
(Continued)

*Primary Examiner* — Amir Alavi
(74) *Attorney, Agent, or Firm* — Taylor Duma L.L.P.

(57) ABSTRACT

In various examples, the present disclosure relates to using temporal filters for automated real-time classification. The technology described herein improves the performance of a multiclass classifier that may be used to classify a temporal sequence of input signals-such as input signals representative of video frames. A performance improvement may be achieved, at least in part, by applying a temporal filter to an output of the multiclass classifier. For example, the temporal filter may leverage classifications associated with preceding input signals to improve the final classification given to a subsequent signal. In some embodiments, the temporal filter may also use data from a confusion matrix to correct for the probable occurrence of certain types of classification errors. The temporal filter may be a linear filter, a nonlinear filter, an adaptive filter, and/or a statistical filter.

20 Claims, 12 Drawing Sheets

Related U.S. Application Data continuation of application No. 17/647,390, filed on Jan. 7, 2022, now Pat. No. 11,721,089, which is a continuation of application No. 16/907,125, filed on Jun. 19, 2020, now Pat. No. 11,222,232.

(51) Int. Cl.
　　*G06F 18/2321*　　(2023.01)
　　*G06N 3/045*　　(2023.01)
　　*G06V 10/764*　　(2022.01)
　　*G06V 20/40*　　(2022.01)
　　*G06V 40/10*　　(2022.01)
　　*G06V 40/20*　　(2022.01)

(52) U.S. Cl.
　　CPC .............. *G06N 3/045* (2023.01); *G06V 20/47* (2022.01); *G06V 40/113* (2022.01); *G06V 40/28* (2022.01)

(58) Field of Classification Search
　　CPC ...... G06N 3/088; G06N 3/092; G06N 3/0475; G06N 3/0454; G06N 3/0464; G06N 3/048; G06N 3/044; G06V 10/82; G06V 10/764; G06V 20/47; G06V 40/113; G06V 40/28; G06F 18/285; G06F 18/2321
　　See application file for complete search history.

(56) References Cited

U.S. PATENT DOCUMENTS

| | | | |
|---|---|---|---|
| 7,116,828 B2* | 10/2006 | Wells ....................... H04N 5/21 | 382/233 |
| 7,693,683 B2 | 4/2010 | Ihara | |
| 7,953,693 B2 | 5/2011 | Smith et al. | |
| 8,087,297 B2 | 1/2012 | Ludwiczak et al. | |
| 8,369,417 B2 | 2/2013 | Au et al. | |
| 8,385,676 B2 | 2/2013 | Weinberger et al. | |
| 8,503,801 B2 | 8/2013 | Schiller et al. | |
| 8,554,715 B2 | 10/2013 | Kraaij et al. | |
| 8,837,819 B1 | 9/2014 | Lees et al. | |
| 8,886,533 B2 | 11/2014 | Chopra et al. | |
| 9,202,110 B2 | 12/2015 | Movellan et al. | |
| 10,262,239 B2 | 4/2019 | Polak et al. | |
| 10,482,328 B2 | 11/2019 | Varadarajan et al. | |
| 10,600,167 B2 | 3/2020 | Schied et al. | |
| 10,701,394 B1 | 6/2020 | Caballero et al. | |
| 10,706,148 B2 | 7/2020 | Dymshits et al. | |
| 10,827,982 B2 | 11/2020 | Sitek | |
| 10,885,698 B2 | 1/2021 | Muthler et al. | |
| 10,893,296 B2* | 1/2021 | Natanzon ............ G06V 20/188 | |
| 10,902,343 B2 | 1/2021 | Andrews et al. | |
| 10,915,731 B2 | 2/2021 | Mccormac et al. | |
| 10,929,665 B2* | 2/2021 | Liu ........................ G06V 10/26 | |
| 10,949,664 B2 | 3/2021 | Su | |
| 10,977,524 B2 | 4/2021 | Samala | |
| 11,120,353 B2 | 9/2021 | Olabiyi et al. | |
| 11,222,232 B1 | 1/2022 | Sivaraman et al. | |
| 11,328,512 B2 | 5/2022 | Narayanmurthy et al. | |
| 11,341,356 B2* | 5/2022 | Frossard ................ G06V 10/25 | |
| 11,381,778 B2 | 7/2022 | Oz et al. | |
| 11,436,839 B2* | 9/2022 | Naser ..................... G06V 20/58 | |
| 11,472,029 B2 | 10/2022 | Cristache | |
| 11,537,840 B2* | 12/2022 | Pau ......................... G06N 5/01 | |
| 11,570,405 B2 | 1/2023 | Punwani et al. | |
| 11,721,089 B2 | 8/2023 | Sivaraman et al. | |
| 11,763,170 B2* | 9/2023 | Bowling .................. G06N 5/02 | 706/12 |
| 12,067,471 B2* | 8/2024 | Gao ........................ G06F 30/27 | |
| 12,197,542 B2* | 1/2025 | Neumann .............. G06V 20/70 | |
| 2012/0036097 A1 | 2/2012 | Prokhorov | |
| 2017/0236051 A1* | 8/2017 | Van Der Made ...... G06N 3/045 | 706/27 |
| 2018/0053108 A1* | 2/2018 | Olabiyi .................. G06N 3/044 | |
| 2019/0034831 A1 | 1/2019 | Perona et al. | |
| 2019/0147338 A1 | 5/2019 | Pau et al. | |
| 2021/0088639 A1 | 3/2021 | Yang | |
| 2021/0319340 A1 | 10/2021 | Shabtay et al. | |
| 2023/0326182 A1 | 10/2023 | Sivaraman et al. | |
| 2024/0371136 A1* | 11/2024 | Sivaraman .......... G06F 18/2321 | |

OTHER PUBLICATIONS

ISO 26262, "Road vehicle—Functional safety," International standard for functional safety of electronic system, https://en.wikipedia.org/wiki/ISO_26262, accessed on Sep. 13, 2021, 8 pgs.

"Taxonomy and Definitions for Terms Related to Driving Automation Systems for On-Road Motor Vehicles", Society of Automotive Engineers (SAE), Standard No. J3016-201609, p. 30 (Sep. 30, 2016).

"Taxonomy and Definitions for Terms Related to Driving Automation Systems for On-Road Motor Vehicles", Society of Automotive Engineers (SAE), Standard No. J3016-201806, p. 35 (Jun. 15, 2018).

Sivaraman, Sakthivel; Non-Final Office Action for U.S. Appl. No. 17/647,390, filed Jan. 7, 2022, mailed Feb. 24, 2023, 18 pgs.

Sivaraman, Sakthivel; Notice of Allowance for U.S. Appl. No. 17/647,390, filed Jan. 7, 2022, mailed Mar. 29, 2023, 8 pgs.

Chen, et al.; "Angular Visual Hardness", arXiv preprint arXiv:1912.02279v3, Feb. 27, 2020, 27 pgs.

Sivaraman, Sakthivel; Non-Final Office Action for U.S. Appl. No. 18/333,281, filed Jun. 12, 2023, mailed Feb. 15, 2024, 24 pgs.

Sivaraman, Sakthivel; Applicant-Initiated Interview Summary for U.S. Appl. No. 18/333,281, filed Jun. 12, 2023, mailed May 13, 2024, 2 pgs.

Sivaraman, Sakthivel; Notice of Allowance for U.S. Appl. No. 18/333,281, filed Jun. 12, 2023, mailed May 21, 2024, 8 pgs.

\* cited by examiner

USING TEMPORAL FILTERS FOR AUTOMATED REAL-TIME CLASSIFICATION

CROSS-REFERENCE TO RELATED APPLICATIONS

This application is a continuation of Ser. No. 18/333,281, filed Jun. 12, 2023, which is a continuation of Ser. No. 17/647,390, filed Jan. 7, 2022, which is a continuation of Ser. No. 16/907,125, filed Jun. 19, 2020. Each of which is hereby incorporated by reference in its entirety.

BACKGROUND

Multiclass classifiers are used to assign a class distribution to an input signal. The class distribution may include a confidence score indicating that the input signal should be assigned to one or more of the classes. For example, multiclass classifiers may be used to classify a temporal sequence of input signals, where each signal in the sequence may be assigned a corresponding class distribution.

The most common approach in existing solutions is to run the classification network at a constant signal analysis rate (e.g., window size). However, this constant analysis rate approach may suffer decreased accuracy during class transitions. For example, mid-transition, the signals being analyzed may include half representing a first class and half representing a second class. As such, existing technologies fail to adapt the classification process to account for possible class transitions.

Currently, despite best efforts at training, classifiers will incorrectly classify some input signals into an improper class. This performance can be measured in using confusion analysis. For example, the current approach is to retrain classifiers until the measured confusion is deemed acceptable for deployment in the particular use case; however, this approach does not account for the confusion when calculating the final classification result. Instead, the typical approach is to use the class assigned the highest confidence score without other considerations.

SUMMARY

Embodiments of the present disclosure relate to using temporal filters for automated real-time classification. Systems and methods are disclosed for improving the performance of a multiclass classifier that may be used to classify a temporal sequence of input signals-such as input signals representative of video frames. A performance improvement of the system may be achieved, at least in part, by applying the temporal filter to an output of the multiclass classifier. The temporal filters described herein may correspond to, without limitation, a linear filter, a nonlinear filter, an adaptive filter, and/or a statistical filter. As an example, a temporal filter may leverage classifications associated with preceding input signals to improve the final classification given to a subsequent signal.

In contrast to conventional systems, such as those described above, the technology described herein may leverage classifications associated with preceding input signals to improve the final classification given to a subsequent signal, while also factoring in a confusion matrix to correct for the probable occurrence of certain types of classification errors. In some embodiments, a preliminary signal analysis may detect a presumptive class change in the classifier output, for example, as evidenced by the highest confidence score in the raw output transitioning from association with a first class to a second class. A class shift may indicate that older output data may be less relevant than the newer output data and this information may be taken into account by the adaptive filter by giving more weight to recent classification outputs when the preliminary signal analysis detects a class shift.

In some embodiments, a normalization process may adjust the raw classification confidence scores according to data from a confusion matrix. In general, the confidence score assigned to a first class (e.g., class A) may be lowered in proportion to the probability that the first class is a false positive of the other classes (e.g., class B, class C, class D). Conversely, the confidence score for a given class may be increased in proportion to the probabilities that other classes are false positives for the given class. The normalization process may optimize or improve the accuracy of the classification by accounting for the probability of different kinds of errors occurring in the classification. As a result, when the normalization process is combined with the temporal filtering operation-which uses data from multiple consecutive classifications—the overall classification accuracy of the system may be meaningfully improved without a significant contribution to the overall latency of the classification pipeline.

BRIEF DESCRIPTION OF THE DRAWINGS

The present systems and methods for using temporal filters for automated real-time classification are described in detail below with reference to the attached drawing figures, wherein.

DETAILED DESCRIPTION

Figure 1:
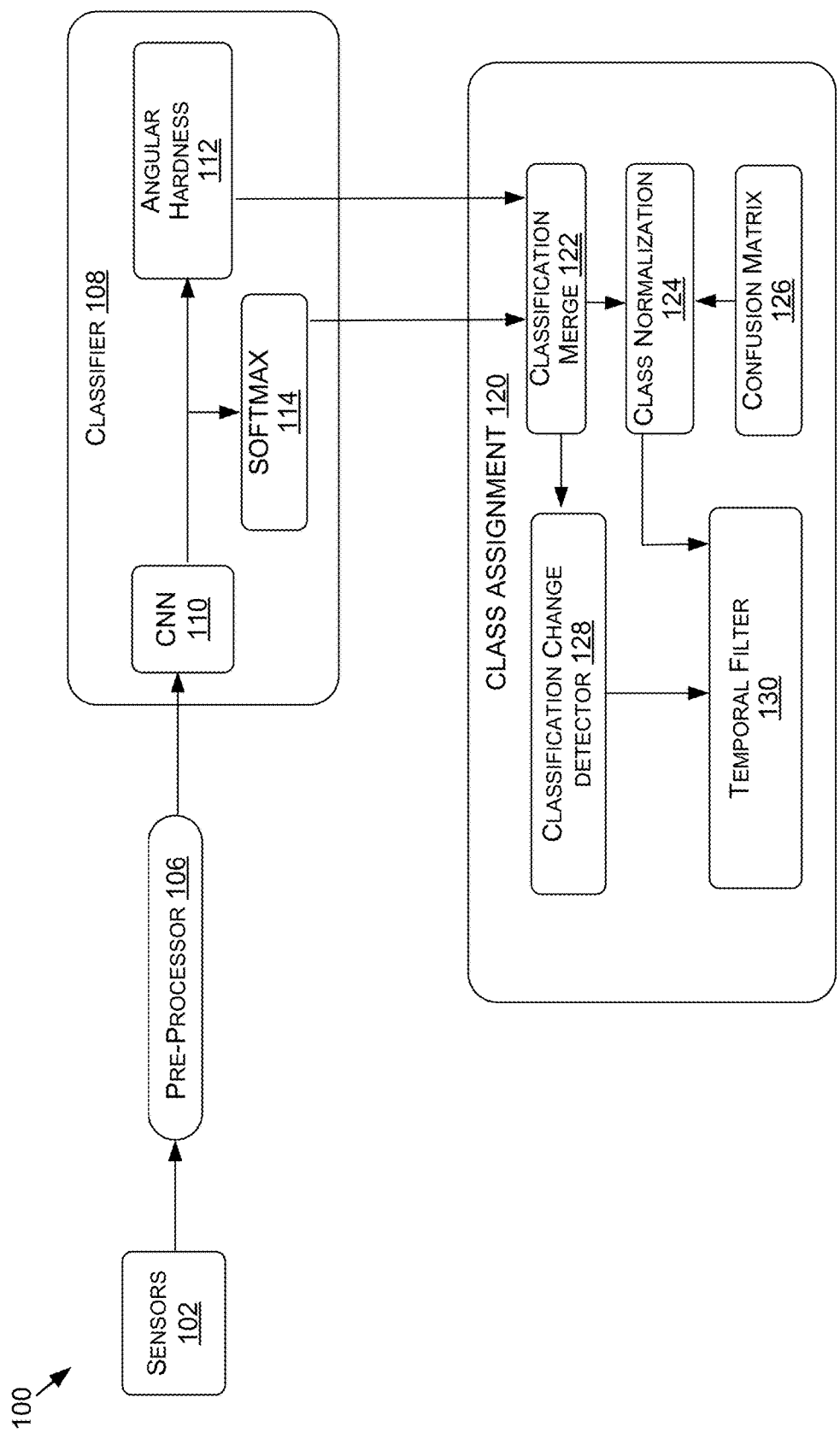
FIG. 1 is an illustration of an example real-time signal classification system, in accordance with some embodiments of the present disclosure.

Systems and methods are disclosed related to using temporal filters for automated real-time classification. The technology described herein improves the performance of a multiclass classifier that may be used to classify a temporal sequence of input signals-such as input signals representative of video frames. A performance improvement of the system may be achieved, at least in part, by applying the temporal filter to an output of the multiclass classifier. For example, the temporal filter may leverage classifications associated with preceding input signals to improve the final classification given to a subsequent signal. In some embodiments, the temporal filter may also use data from a confusion matrix to correct for the probable occurrence of certain types of classification errors.

Depending on the embodiment, the temporal filter may take many different forms. For example, the temporal filter may be a linear filter, a nonlinear filter, an adaptive filter, and/or a statistical filter. In each example, the overall operation of the filter may be similar. For example, the filter may receive a temporal sequence of outputs from the multiclass classifier—e.g., x number of consecutive outputs generated by classifying x number of consecutive input signals. In embodiments, the number of outputs received may be described as an analysis window. As the outputs are received, the outputs may be filtered together and a final confidence score for each class in each instance of the output data may be generated using the temporal filter.

Each individual output in the sequence may include a series of confidence scores for each class the multiclass classifier is trained to identify. For example, a classifier trained to assign one of five different classes to an input signal would output a confidence score for each of the five classes. As described herein, the temporal filter may receive, as input, a sequence of outputs of the multiclass classifier and generate a final confidence factor for each class. The final confidence factor may correspond to the final output of the process and effectively replace the newest raw output within the sequence of outputs input to the temporal filter. The final output may then be used to assign an active classification to the corresponding input signal, and this process may repeat as new outputs are received from the classifier—with the oldest output dropping out of the sequence and the newest one being added (e.g., as a rolling buffer of output signals).

Aspects of the technology described herein may account for confusion between classes within the temporal filter by applying a class normalization to the raw output data using data from a confusion matrix. For example, the class confusion may be determined by analyzing the performance of the trained classifier using ground truth data. The ground truth data may be determined, as a non-limiting example, by having a user assign a ground truth label to the signal input used to test the classifier performance. In some embodiments, the class confusion analysis may be an off-line process that results in a class confusion matrix or other memorialization of the confusion analysis. However, in other embodiments, the class confusion analysis may be on an on-line process, a process that occurs at initialization of the system, and/or at another time.

Data from the confusion matrix may be used in a normalization process. For example, because class confusion may assign a probability of occurrence to certain types of classification failures, then, for a given class, the confusion matrix may include data indicating a probability that an input signal with a ground truth classification in the given class is a true positive or a false positive classification. A true positive may indicate that the input signal was correctly classified into the given class and a false positive may indicate that an input signal was incorrectly classified into a different class. Each different class may receive its own probability of receiving a false positive classification for the given class.

In some embodiments, the normalization process may adjust the raw classification confidence scores according to data from the confusion matrix. In general, the confidence score assigned to a first class (e.g., class A) may be lowered in proportion to the probability that the first class is a false positive of the other classes (e.g., class B, class C, class D). Conversely, the confidence score for a given class may be increased in proportion to the probabilities that other classes are false positives for the given class. The normalization process may optimize or improve the accuracy of the classification by accounting for the probability of different kinds of errors occurring in the classification. As a result, when the normalization process is combined with the temporal filtering operation-which uses data from multiple consecutive classifications—the overall classification accuracy of the system may be meaningfully improved without a significant contribution to the overall latency of the classification pipeline.

As mentioned, the temporal filter may be a linear filter, a nonlinear filter, an adaptive filter, and/or a statistical filter. Where an adaptive filter is implemented, the adaptive filter may use a preliminary signal analysis to change features of the function used within the temporal filter. The preliminary signal analysis may be, in embodiments, executed over a smaller output window than is used by the temporal filter. For a non-limiting example, the preliminary signal analysis may be over five consecutive outputs, whereas a default window for the temporal filter may be twenty or more consecutive outputs. In some embodiments, the preliminary signal analysis may detect a presumptive class change in the classifier output, for example, as evidenced by the highest confidence score in the raw output transitioning from association with a first class to a second class. This may indicate a classification shift from the first class to the second class.

A class shift may indicate that older output data may be less relevant than the newer output data. This information may be taken into account by the adaptive filter by giving more weight to recent classification outputs when the preliminary signal analysis detects a class shift. The change to the weighting values may be applied to all classes or to just affected classes. For example, a presumptive class shift between the first class and the second class may cause the adaptive filter to adjust a decay function within the adaptive filter to give less weight to older outputs being considered by the filter that correspond to the first class, while leaving the default weights in place for the other classes.

Aspects of the technology described herein may work with a variety of different multiclass classifiers, but will most often be described herein in the context of convolutional neural networks (CNNs). In some aspects, the multiclass classifier described herein may not consider classifications assigned to preceding input signals when generating a classification for a subsequent signal in a temporal sequence. The technology described herein can serve as an alternative to a recurrent neural network (RNN), such as Long Short Term Memory (LSTM) networks, and other classifiers that already consider preceding classification data when calculating a subsequent classification. The use of the temporal filter on the output of a CNN consumes less computer resources and contributes less to latency than using an RNN-thereby decreasing runtime of the system—while achieving performance improvements. The temporal filter also allows for application specific classification tuning that is not possible with an RNN. For example, different filter parameters may be used on different class confidence scores where avoiding a false positive for some classes is more important than for other classes.

With reference to FIG. 1, FIG. 1 shows a real-time signal classification system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, components, features, and/or functionality of the system 100 may be similar to that of vehicle 800 of FIGS. 8A-8D and/or example computing device 900 of FIG. 9.

At a high level, the real-time signal classification system 100 may assign a classification to an input signal in a temporal series. The sensors 102 may capture a temporal sequence of input signals—such as input signals representative of video frame—and the preprocessor 106 may prepare the input signals for the classifier 108. The classifier 108 may be a multiclass classifier that uses one or more CNNs—or other deep neural network (DNN) and/or machine learning models—to process the inputs. In some embodiments, the classifier 108 may generate two different confidence score distributions where one of the distributions is generated by a softmax function 114 and the other distribution is generated by an angular visual hardness function 112. The classification merge component 122 may then combine these two distributions into a single raw distribution used by subsequent components in the system, such as the class normalization component 124 and/or the classification change detector 128.

The class normalization component 124 may normalize the raw distribution using data from the confusion matrix 126. The confusion matrix 126 may include values representative of a probability that a given input assigned into a first class, for example, should actually be assigned to a different class. The normalization process can raise or lower a raw confidence score for a class based on the confusion probabilities with other classes. The normalized confidence score distribution can be sent to the temporal filter 130 for use in making a final classification. The classification change detector 128 may determine when a class change has occurred within the temporal sequence of input signals and this change detection may be used to tune the temporal filter 130 in real time to make a more accurate classification, especially around class transitions.

The system 100 may include sensors 102 that may generate dimensional data (e.g., one-dimensional (1D), 2D, 3D, etc.). For example, one or more sensors 102 may generate data in a first dimensional space, such as 2D, and one or more sensors 102 may generate data in a second dimensional space, such as 3D. The sensor data may include, without limitation, sensor data from any of the sensors 102 of the vehicle 800 (and/or other vehicles or objects, such as robotic devices, VR systems, AR systems, etc., in some examples). For example, and with reference to FIGS. 8A-8C, the sensor data may include the data generated by, without limitation, RADAR sensor(s) 860, ultrasonic sensor(s) 862, LIDAR sensor(s) 864, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, and/or other sensor types. For example, although reference is primarily made to the sensors 102 including cameras and depth sensors (e.g., LIDAR sensors 864, RADAR sensors 860, etc.), this is not intended to be limiting, and the sensors 102 may alternatively or additionally be generated by any of the sensors of the vehicle 800, another vehicle, an object, a machine (e.g., a robot), and/or another system (e.g., a virtual vehicle in a simulated environment, a traffic system, a surveillance system, etc.).

In some examples, the sensor data may be generated by one or more forward-facing sensors, side-view sensors, interior sensors, and/or rear-view sensors of the vehicle 800 and/or other machine type. This sensor data may be useful for identifying, detecting, classifying, and/or tracking movement of objects around the vehicle 800 and/or other machines within the environment. In embodiments, any number of sensors 102 may be used to incorporate multiple fields of view (e.g., the fields of view of the long-range cameras 898, and/or the forward-facing stereo camera 868, and/or the forward facing wide-view camera 870 of FIG. 8B). In some embodiments, such as described herein, signals—e.g., representing image data—generated by a camera(s) interior to the vehicle 800 designed to capture gestures made by a driver, passenger, or other person in the vehicle 800 may be processed by one or more DNNs. The classification of these signals by the DNNs into a gesture class(es) may be used to control various components in the vehicle 800, such as a comfort system entertainment system, navigation system, and/or the like.

As such, the inputs to the classifier 108 may include image data representing an image(s) and/or image data representing a video (e.g., snapshots of video), and/or may represent sensor data generated by a sensor depicting a sensory field of the sensor. Where the sensor data includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data may be used by the system 100 without any pre-processing (e.g., in a raw or captured format), while in other examples, the sensor data may undergo pre-processing by the sensor data preprocessor 106.

The sensor data preprocessor 106 may perform various operations on the sensor data to generate preprocessed sensor data. Non-limiting examples of preprocessing operations include noise balancing, demosaicing, scaling, cropping, augmentation, white balancing, tone curve adjustment, and the like. As used herein, the sensor data applied to the classifier 108 may reference unprocessed sensor data, pre-processed sensor data, or a combination thereof.

Referring again to FIG. 1, the outputs of the preprocessor 106 may be applied to the classifier 108. The classifier 108 may generate raw classification outputs using the sensor data as input. In some embodiments, the classifier 108 may generate a temporal series of raw classification outputs for a temporal sequence of sensor data, such as a series of images.

As an example, a temporal series may be a series of data points arranged in time order and, in embodiments, the temporal series of inputs may be a sequence of data captured by the sensors 102 at successive equally-spaced points in time (e.g., similar to that of a video feed). A temporal series of classification distributions may comprise an individual distribution for each input signal.

The classifier 108 may include a CNN (and/or another type of DNN or machine learning model), an angular visual hardness function 112, and/or a softmax function 114. Where a CNN is implemented, the CNN can take different forms depending on implementation preferences. For example, the CNN can have different types and combinations of layers (e.g., input layers, convolutional layers, pooling layers, ReLU layers, deconvolutional layers, and fully connected layers). In different embodiments, layers (e.g., convolutional layers) can have different dimensions that may be selected based on dimensions of an input signal. While described as a CNN herein, embodiments may use other machine learning models, as described subsequently.

The softmax function 114 may generate a confidence score distribution from data generated by the CNN 110. The softmax function 114 may correspond to an activation function that turns numbers (e.g., logits) into probabilities that sum to one. The softmax function 114 may output a vector that represents the probability distributions of a list of potential outcomes. This probability distribution may be described as a confidence score distribution herein. The softmax function 114 may turn logits (numeric output of the last linear layer of a multi-class classification CNN 110) into probabilities by taking the exponents of each output and then normalizing each number by the sum of those exponents so the entire output vector adds up to one—e.g., all probabilities should add up to one.

The angular visual hardness (AVH) function 112 may also generate a confidence score distribution from data generated by the CNN 110. AVH may be computed using the weight vector and the feature map in the last layer of the CNN 110. AVH may focus on the angle between these vectors to generate a confidence score, and the AVH function 112 may generate a confidence score distribution that assigns a probability to each class the AVH function 112 (in combination with CNN 110) is trained to recognize.

If the system 100 is for object detection and classification by the vehicle 800, the classes may include, without limitation, vehicles, pedestrians, and animals, or may include more granular classes such as SUVs, sedans, busses, bicyclists, adults, children, dogs, cats, horses, etc. Where the system 100 is for object detection and classification by a robot, the classes may include, without limitation, pedestrians, other robots, vehicles, etc. Where the system 100 is for object detection and classification by an aircraft or drone, the classes may include aircraft, drones, birds, buildings, vehicles, pedestrians, etc. As such, depending on the implementation of the system 100, the classes that the CNN 110 (and softmax function 114 and AVH function 112) is trained to predict may vary.

Figure 2:
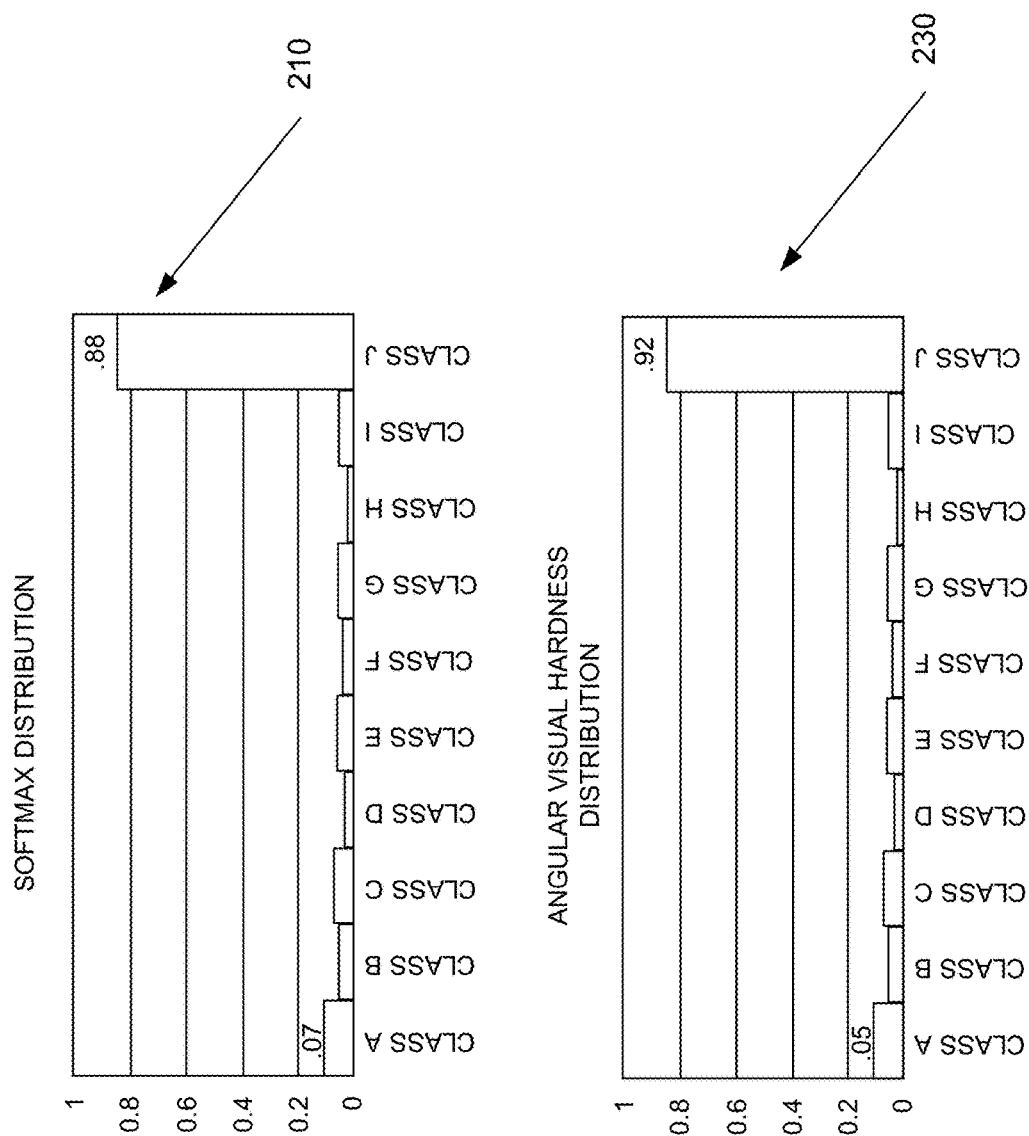
FIG. 2 is an illustration of an example softmax output and an angular hardness output, in accordance with some embodiments of the present disclosure.

As described previously, the softmax function 114 and the AVH function 112 may generate confidence score distributions, as illustrated in FIG. 2. FIG. 2 is an illustration of an example softmax output 210 and an example angular visual hardness output 220, in accordance with some embodiments of the present disclosure. The softmax output 210 may be generated by the softmax function 114, and the softmax output 210 may include a confidence score for each class the multiclass classifier is trained to identify. In this example, the classes include class A, class B, class C, class D, class B, class F, class G, class H, class I, and class J. Class J is assigned the highest score of 0.88, while class A receives the next highest score at 0.07. A score is also assigned to the other classes with the sum of all assigned confidence scores equaling 1. The softmax output 210 may be generated for each image processed in a temporal series of images.

The angular visual hardness output 220 may also include a score for each class, and may be generated by the angular visual hardness function 112. Class J is assigned the highest score of 0.92, while class A receives the next highest score at 0.05. This illustrates that the AVH output 220 and the softmax output 210 may differ. A score is also assigned to the other classes with the sum of all assigned confidence scores equaling 1. The angular visual hardness output 220 may be generated for each image processed of a temporal series of images.

The classification merge component 122 may accept the angular visual hardness output 220 and the softmax output 210 as input and generate a single confidence score distribution for a single image input into the CNN 110. In some embodiments, the outputs are merged by averaging the two outputs (e.g., with equal weighting). In another embodiment, the highest output assigned to a class in either output is accepted and the lower value dropped. In further embodiments, the lowest output assigned to a class is accepted and the higher value is dropped. In another embodiment, more weight is given to one output than the other when the classification merge component 122 generates the raw confidence score distribution for an image. For example, the angular visual hardness output 220 may be given 70% weight in calculating the final combined confidence score distribution.

In one embodiment, a comparison is made between one or more class confidence scores in the two outputs. For example, a comparison of the class with the highest confidence score in each output may be made and, if the class comparison does not agree (e.g., if the softmax output 210 associates a first class with the highest score and the angular visual hardness output 220 associates a second class with the highest score), then the two outputs may not be combined and only one of the outputs may be used, while the other is dropped. In another embodiment, when the difference between the highest class confidence score in the softmax output 210 and the highest class confidence score in the angular visual hardness output 220 exceeds a difference threshold, then the higher of the two scores may be used without averaging or otherwise combining the two outputs. For example, if the softmax class A confidence score is 0.91 and the angular visual hardness confidence score for class A is 0.73, then only the softmax confidence score would be used if the difference threshold was 0.15. Otherwise, if the two scores are within the threshold, then the two scores are averaged or otherwise combined. The combined confidence score distribution generated by the classification merge component 122 may be communicated to both the class normalization component 124 and the classification change detector 128. The combined distribution may be described as the raw confidence score distribution or simply the raw distribution.

The classification merge component 122 may correspond to the first component within the class assignment engine 120. The class assignment engine 120 may include two parallel processes that may be combined at the temporal filter 130 to generate a final class assignment for a given input signal. One of the two parallel processes may include a class normalization operation performed by a class normalization component 124. Once generated, the normalized confidence score distribution may then be communicated to the temporal filter 130 for further processing. The second parallel process is a classification change detection performed by the classification change detector 128. Classification changes may be communicated to the temporal filter 130 and used to tune the filter in response the detected changes. The change detection process is described with reference to FIG. 3. The normalization process is described with reference to FIG. 4. While these processes may be used together in some embodiments, the two processes may be used without the other in some embodiments. Thus, the normalization process may work without change detection and the change detection may work without normalization.

Figure 3:
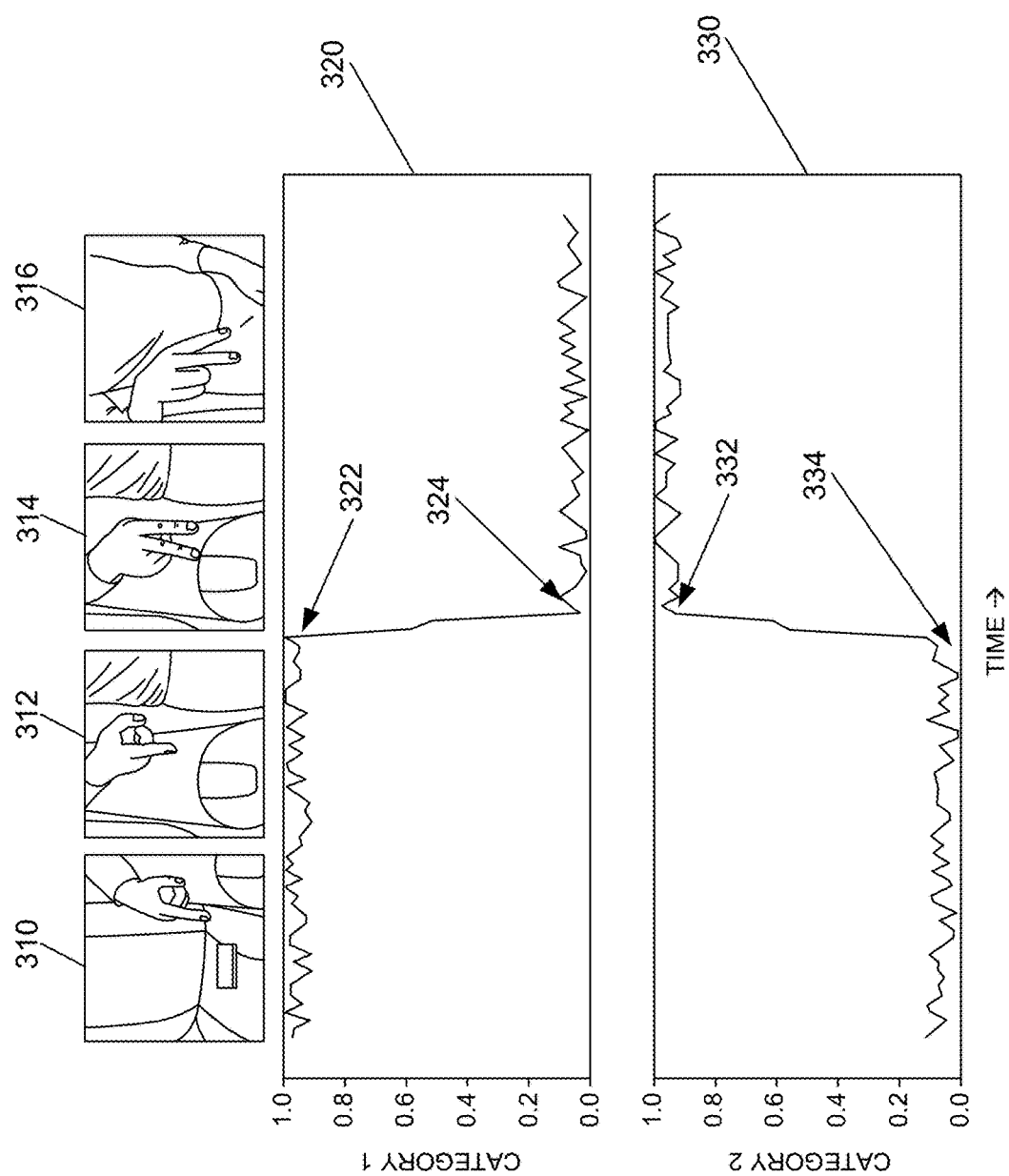
FIG. 3 is an illustration of an example classification change in response to a signal change, in accordance with some embodiments of the present disclosure.

FIG. 3 illustrates a classification change in response to a signal change. The classifications of a temporal series of images shown in FIG. 3 may be generated by a classifier, such as the classifier 108 described herein. Example images from a temporal series of images are shown in FIG. 3. The example images may be captured by a gesture control system within a vehicle, such as vehicle 800. The gesture control systems may control car functions in response to gestures made by a user as captured in video of a gesture performance area (e.g., a cabin of the vehicle 800, or a portion thereof). When no gesture is being made, the images captured should be classified as capturing no control gesture. When the user makes a gesture within the gesture performance area, the gesture control system may assign a classification to the captured image and perform a corresponding function (e.g., increase the volume). A user may make a single gesture or a series of gestures. Making a single gesture may cause the classification system to transition between a no gesture classification and a classification of the gesture made. Making multiple gestures in series may cause the classification system to transition between different gestures. As such, in some examples, there may be a transition for the classification system to handle.

Transitions may cause uncertainty in classification systems that analyze a series of consecutive input signals to generate an output. As an example, a classification for a current point in time may be generated using the last 20 images captured in a temporal sequence. After a transition occurs, some of the images used to generate an output may capture an earlier gesture, while another portion of the images capture a current gesture, and a third portion may capture a user transitioning between gestures, which is not a gesture at all. The images and corresponding classifications shown in FIG. 3 illustrate this transitional challenge.

The example images from the temporal series include a first finger-pointing image 310 and a second finger-pointing image 312. The example images also include a first v-finger image 314 and a second v-finger image 316. The first finger-pointing image 310 captures a user pointing an index finger forward. The second finger-pointing image 312 also captures a user pointing an index finger forward, but in a position that is slightly different from the position captured by the first finger-pointing image 310. This difference illustrates the challenge a classifier faces in classifying an image content. Both images should receive the same classification despite the differences between the images.

The first v-finger image 314 captures a user pointing two fingers forward forming a V shape. The second v-finger image 316 also captures a user pointing two fingers forward forming a V shape, but in a position that is slightly different from the position captured by the first v-finger image 314. Posing fingers in a V shape is a different gesture than pointing the index finger forward and should be classified into a different class.

The class A graph 320 shows a classification distribution assigned to class A over the temporal series of images and the class B graph 330 shows a classification distribution assigned to class B over the temporal series of images. In this illustration, class A corresponds to the finger-pointing gesture and class B corresponds to the V gesture. As can be seen, the confidence score that the classifier assigned to class A ranges between one and 0.9 when images 310 and 312 are processed. The confidence score drops sharply at transitional entry 322 until it continues fluctuating below 0.1 after transitional exit 324. The class B graph 330 shows the other side of the transition into class B, where the confidence increases sharply at transitional entry 232 until it continues fluctuating above 0.9 after transitional exit 334.

During a transition represented by entry points 322 and 332 and transitional exits 324 and 334, the classifier may be analyzing images showing content in two or three different classifications (e.g., class A, class B, and no class). A goal of the technology described herein is to detect these transitions and adapt a temporal filter in real time to more accurately classify signals received during and after a transition. This improvement may be achieved, in part, using the classification change detector 128 in combination with the temporal filter 130.

The classification change detector 128 may analyze the temporal series of raw classification distributions to detect a class change. The classification change detector 128 may analyze a smaller window of distributions than the temporal filter 130. For example, the classification change detector 128 may look for a change by analyzing six consecutive distributions, while the temporal filter 130 may generate a final classification looking at 20 consecutive distributions. These numbers are simply used for the sake of example and are not intended to be limiting. The classification change detector 128 may detect a change by looking at the class assigned the highest confidence score within a distribution. When the class assigned the highest confidence score changes over a threshold number of consecutive distributions, then generation of a change notice may be triggered. The threshold number may be selected to avoid triggering a change notice upon detecting a change in just two consecutive distributions, which may occur from time to time in response to processing a noisy signal. A different threshold number may be selected for different implementations depending on perceived classification jitter (e.g., occurrence of false class transitions between consecutive distributions).

In some embodiments, a different threshold number may be used for different class transitions. For example, the confusion matrix 126 may show significant class confusion between class A and class B. When two classes have a comparatively high amount of class confusion, then a larger threshold number can be used, and when two classes have a comparatively low amount of class confusion, then a lower threshold number can be used. In an embodiment, the classification change detector 128 may detect a presumptive class change between two consecutive class distributions and then determine the threshold to be used based on the two classes involved in the change. Once the class-specific threshold is hit, the change notification is generated.

Among other information, the change notification can identify the two or more classes involved in the change. The change notification can also identify an input signal that corresponds to the transition entry and an input signal that corresponds to the transition exit. In some embodiments, the transition entry and exit can be used to tune the temporal filter 130, for example by adjusting an analysis window to exclude class distributions calculated before a transition entry and/or before a transition exit. Once generated, the change notification may be communicated to the temporal filter 130.

As mentioned, the class normalization component 124 may generate a normalized class distribution that adjusts individual confidence scores within the distribution according to a likelihood of confusion between different classes. The likelihood of confusion is illustrated by the confusion matrix 126 shown in FIG. 4.

Figure 4:
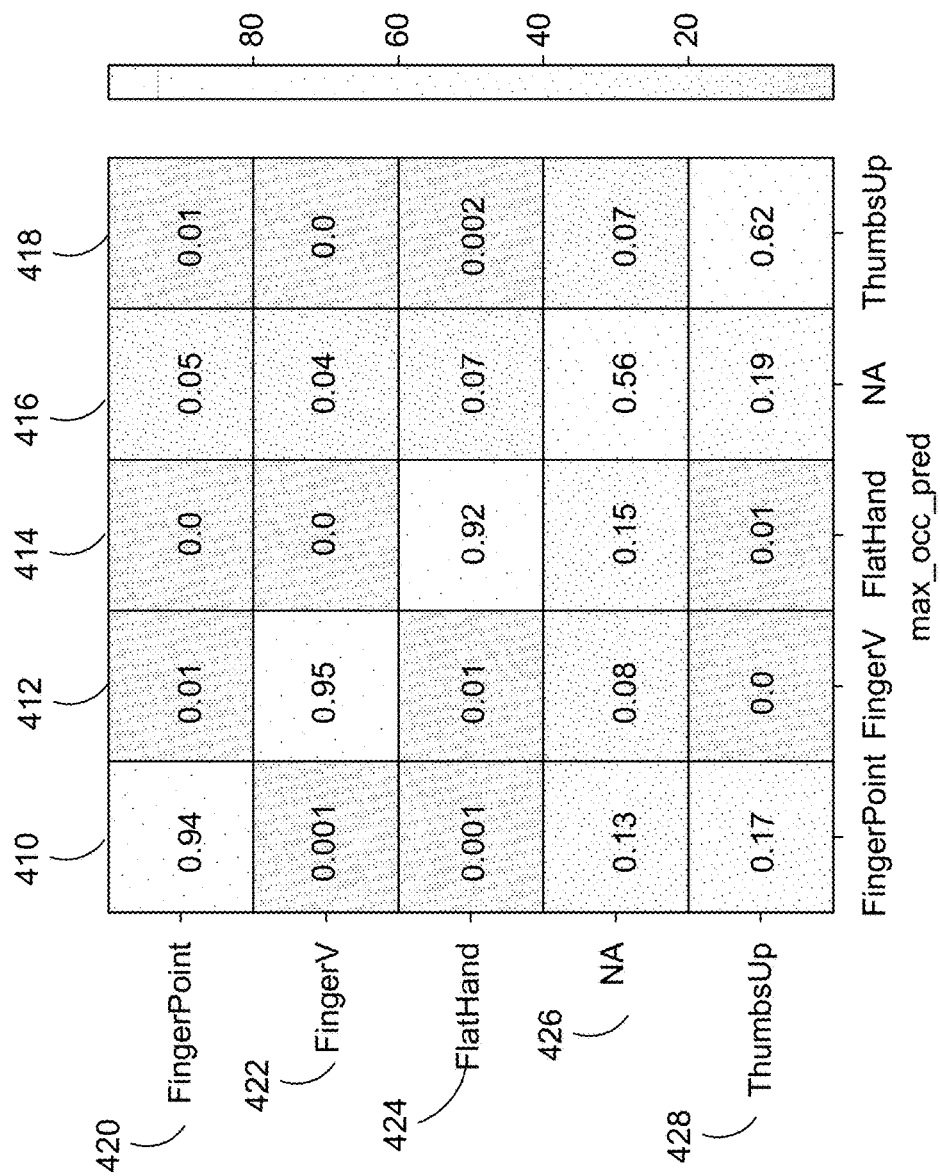
FIG. 4 is an illustration of an example confusion matrix, in accordance with some embodiments of the present disclosure.

FIG. 4 shows a confusion matrix 400 for a multiclass classifier trained to assign an input to one of five different classes. The class confusion may be determined by analyzing the performance of the trained classifier using ground truth data. The ground truth data may be determined, as a non-limiting example, by having a user assign a ground truth label to the signal input used to test the classifier performance. In some embodiments, the class confusion analysis may be an off-line process that results in a class confusion matrix or other memorialization of the confusion analysis. However, in other embodiments, the class confusion analysis may be on an on-line process, a process that occurs at initialization of the system, and/or at another time.

Data from the confusion matrix 400 may be used in a normalization process. For example, because class confusion may assign a probability of occurrence to certain types of classification failures, then, for a given class, the confusion matrix may include data indicating a probability that an input signal with a ground truth classification in the given class is a true positive or a false positive classification. A true positive may indicate that the input signal was correctly classified into the given class and a false positive may indicate that an input signal was incorrectly classified into a different class. Each different class may receive its own probability of receiving a false positive classification for the given class.

Each class is assigned both a row and a column in the matrix 400. In this example, the multiclass classifier is trained to identify hand gestures. The figure point gesture is assigned to column 410 and row 420, the finger V gesture is assigned to column 412 and row 422, the flat hand gesture is assigned to column 414 and row 424, the no gesture is assigned to column 416 and row 426, and the thumbs-up gesture is assigned to column 418 and row 428.

The class confusion can be identified by looking at the intersection of different rows and columns. The lighter the square shading the higher the confusion. Each square is associated with a probability (not shown). Taking the finger point gesture as an example, the probability assigned to the intersection of column 410 and row 420 may be 94%. This box is the intersection of the finger point gesture and the finger point gesture and represents the baseline probability that a finger point gesture will be correctly identified by the classifier (e.g., true positive). The probability assigned to the intersection of column 412 and row 420 may be 1%, which may indicate there is a 1% probability that the finger point gesture will be incorrectly classified as a finger V gesture. The probability assigned to the intersection of column 414 and row 420 may be 0%, which may indicate that the multiclass classifier does not incorrectly assign finger point gestures as flat hand gestures. The probability assigned to the intersection of column 416 and row 420 may be 5%, which may indicate there is a 5% probability that the finger point gesture will be incorrectly classified as no gesture. Similarly, the probability assigned to the intersection of column 418 and row 420 may be 1%, which may indicate there is a 1% probability that the finger point gesture will be incorrectly classified as no gesture.

The probability that the finger point gesture class is incorrectly assigned to a different class is recorded in column 410. The probability assigned to the intersection of column 410 and row 422 may be 0.13%, which may indicate there is a 0.13% probability that the finger V gesture will be incorrectly classified as a finger point gesture. The probability assigned to the intersection of column 410 and row 424 may be 0.16%, which may indicate there is a 0.16% probability that the flat hand gesture will be incorrectly classified as a finger point gesture. The probability assigned to the intersection of column 410 and row 426 may be 13%, which may indicate there is a 13% probability that the flat no gesture will be incorrectly classified as a finger point gesture. The probability assigned to the intersection of column 410 and row 428 may be 17.5%, which may indicate there is a 17.5% probability that the thumbs up gesture will be incorrectly classified as a finger point gesture. All other boxes in the matrix 400 may also be associated with values.

The class normalization component 124 uses the confusion matrix 126 to generate a normalized class distribution. The normalization process may adjust the raw classification confidence scores according to data from the confusion matrix 400. In general, the confidence score assigned to a first class (e.g., class A) may be lowered in proportion to the probability that the first class is a false positive of the other classes (e.g., class B, class C, class D). Conversely, the confidence score for a given class may be increased in proportion to the probabilities that other classes are false positives for the given class. The normalization process may optimize or improve the accuracy of the classification by accounting for the probability of different kinds of errors occurring in the classification. As a result, when the normalization process is combined with the temporal filtering operation-which uses data from multiple consecutive classifications—the overall classification accuracy of the system may be meaningfully improved without a significant contribution to the overall latency of the classification pipeline.

Using the example values described above for the finger point gesture, the normalization of a raw confidence score within a distribution may be illustrated. Assume, as an example, that a raw confidence of 0.9 is assigned to the finger point gesture in the raw distribution. The raw confidence value may be adjusted upward based on the probabilities that a finger point gesture would be assigned to a different class. This probability can be determined by adding the values in the boxes of row 420, excluding the value in the box representing the intersection of row 410 and 420, which is a true positive. As described above, these other values total to 7%. The raw confidence value may be adjusted downward based on the probabilities that a different gesture would be incorrectly assigned as a finger point gesture. This probability can be determined by adding the values in the boxes of column 410, excluding the value in the box representing the intersection of row 410 and 420, which is a true positive. These other values total 31%. Taken together, the raw confidence score may be decreased by 24% (+7−31) to 0.684. Other methods of calculating the normalized confidence score may be used in embodiments of the present disclosure. The overall goal may be to increase the raw confidence score in proportion to the probability a true first class input is classified incorrectly into a different class and to reduce the confidence score in proportion to the probability that a first-class classification is assigned when the true class is other than the first class. Here the first class is just used as an example class. A similar adjustment can be determined for each class.

The temporal filter 130 may assign a final class distribution using a series of the normalized class distributions as input. The class assignment engine 120 may use the final distribution to select the final class, which may be the class assigned the highest confidence score in the final distribution. In general, the temporal filter 130 may use a temporal series of class distributions to generate a single class distribution representative of a classification of a single input. In this way, past class distributions contribute to calculating the current class distribution.

Depending on the embodiment, the temporal filter may take many different forms. For example, the temporal filter may be a linear filter, a nonlinear filter, an adaptive filter, and/or a statistical filter. In each example, the overall operation of the filter may be similar. For example, the filter may receive a temporal sequence of outputs from the multiclass classifier 108—e.g., x number of consecutive outputs generated by classifying x number of consecutive input signals. In embodiments, the number of outputs received may be described as an analysis window. As the outputs are received, the outputs may be filtered together and a final confidence score for each class in each instance of the output data may be generated using the temporal filter.

Each individual output in the sequence may include a series of confidence scores for each class the multiclass classifier is trained to identify. For example, a classifier trained to assign one of five different classes to an input signal would output a confidence score for each of the five classes. As described herein, the temporal filter may receive, as input, a sequence of outputs of the multiclass classifier and generate a final confidence factor for each class. The final confidence factor may correspond to the final output of the process and effectively replace the newest raw output within the sequence of outputs input to the temporal filter. The final output may then be used to assign an active classification to the corresponding input signal, and this process may repeat as new outputs are received from the classifier—with the oldest output dropping out of the sequence and the newest one being added (e.g., as a rolling buffer of output signals).

As mentioned, the temporal filter may be a linear filter, a nonlinear filter, an adaptive filter, and/or a statistical filter. Linear filters process time-varying input signals to produce output signals, subject to the constraint of linearity (i.e., the results can be graphed to form a line). The nonlinear filter may be an exponential filter that smooths time series data using an exponential window function. Whereas a simple moving average of the past observations are weighted equally (e.g., statistical filter), exponential functions are used to assign exponentially decreasing weights over time. The statistical filter can calculate a moving average or some other statistical measure over a window of observations.

When an adaptive filter is implemented, the adaptive filter may use a change notification generated by the classification change detector 128. The preliminary signal analysis may be, in embodiments, executed over a smaller output window than is used by the temporal filter. For a non-limiting example, the preliminary signal analysis may be over five consecutive outputs, whereas a default window for the temporal filter may be twenty or more consecutive outputs. In some embodiments, the preliminary signal analysis may detect a presumptive class change in the classifier output, for example, as evidenced by the highest confidence score in the raw output transitioning from association with a first class to a second class. This may indicate a classification shift from the first class to the second class.

When the temporal filter 130 responds to a change notification generated by the classification change detector 128, the temporal filter may be described as an adaptive filter. The adaptive filter may be a linear filter, a nonlinear filter, and/or a statistical filter. The adaptive filter may adapt differently depending on the underlying filter being implemented. For example, an adaptive filter may adjust the window size for a statistical filter or a linear filter. The window size may be temporarily decreased in response to a change notification. The goal of the decreased window size may be to emphasize more recent scores in the calculation. Decreasing the window size has the effect of omitting order calculations from the temporal series as the older calculations are more likely to represent pre-transitional observations that will tend to make the final determination less accurate. Omitting these observations improves the accuracy of the final classification result. For example, decreasing the window size from 20 observations to 10 would cause the 10 oldest observations to be omitted from the calculation of the class distribution.

The original window size may be restored to its original size upon processing a threshold number of observations (e.g., normalized classification distributions). In one embodiment, the threshold number is equal to or greater than the window size decrease. For example, if the window size is decreased by 10 observations then the window size could be increased to the original size after processing 10 consecutive input signals within a temporal sequence at the decreased window size. In one embodiment, the increase is a step increase. For example, the window may increase in size by an increment of one with each additional observation processed until the original size is reached.

In the case of an exponential filter (e.g., nonlinear), the adaptive filter can maintain the same window size, but effectively deemphasize older observations by increasing a decay rate within the exponential filter. The increased decay rate gives less weight to older observations and more weight to newer observations.

Figure 5:
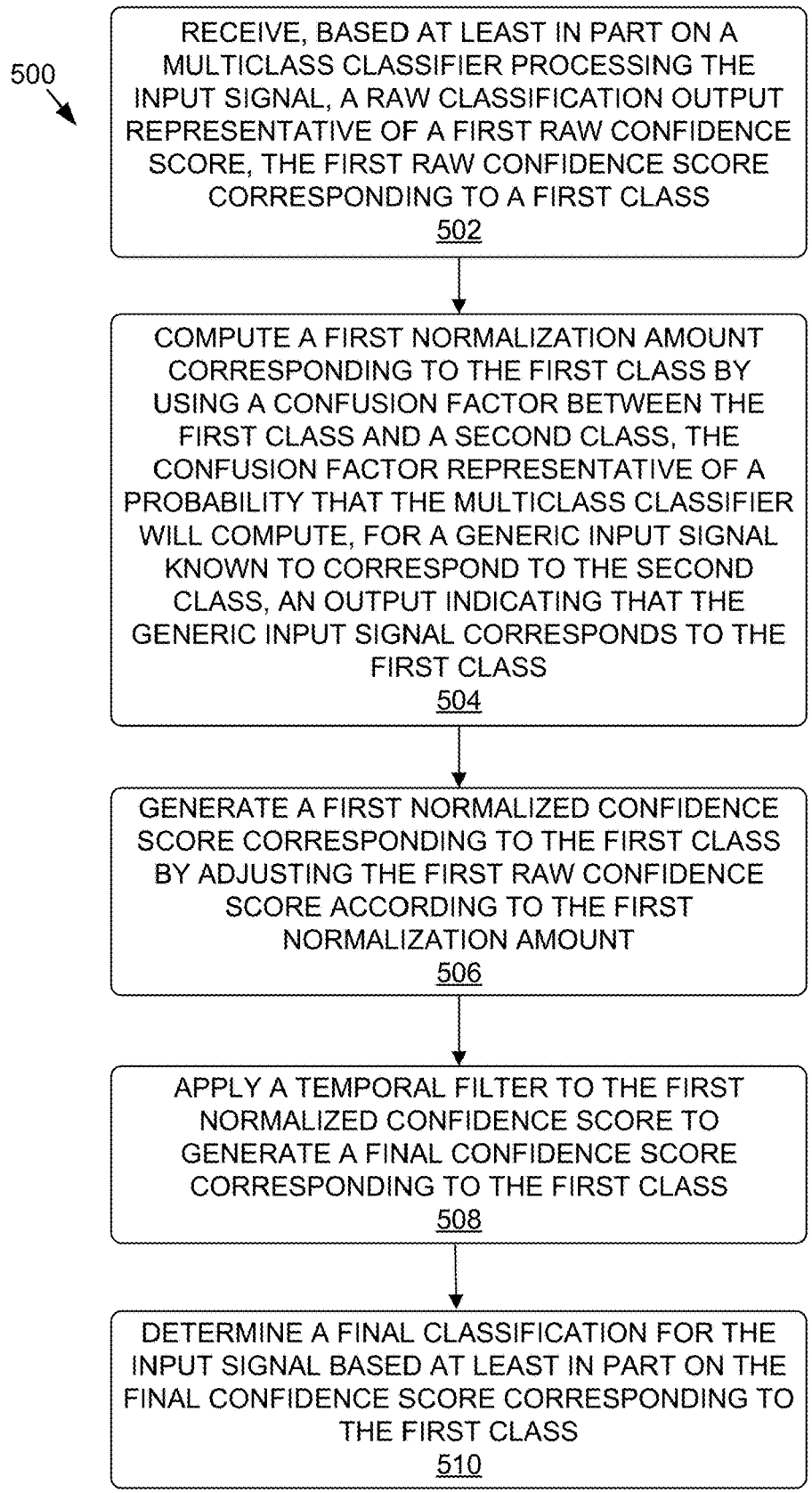
FIGS. 5-7 are flow charts showing methods of assigning a classification to an input signal, in accordance with some embodiments of the present disclosure.
Figure 6:
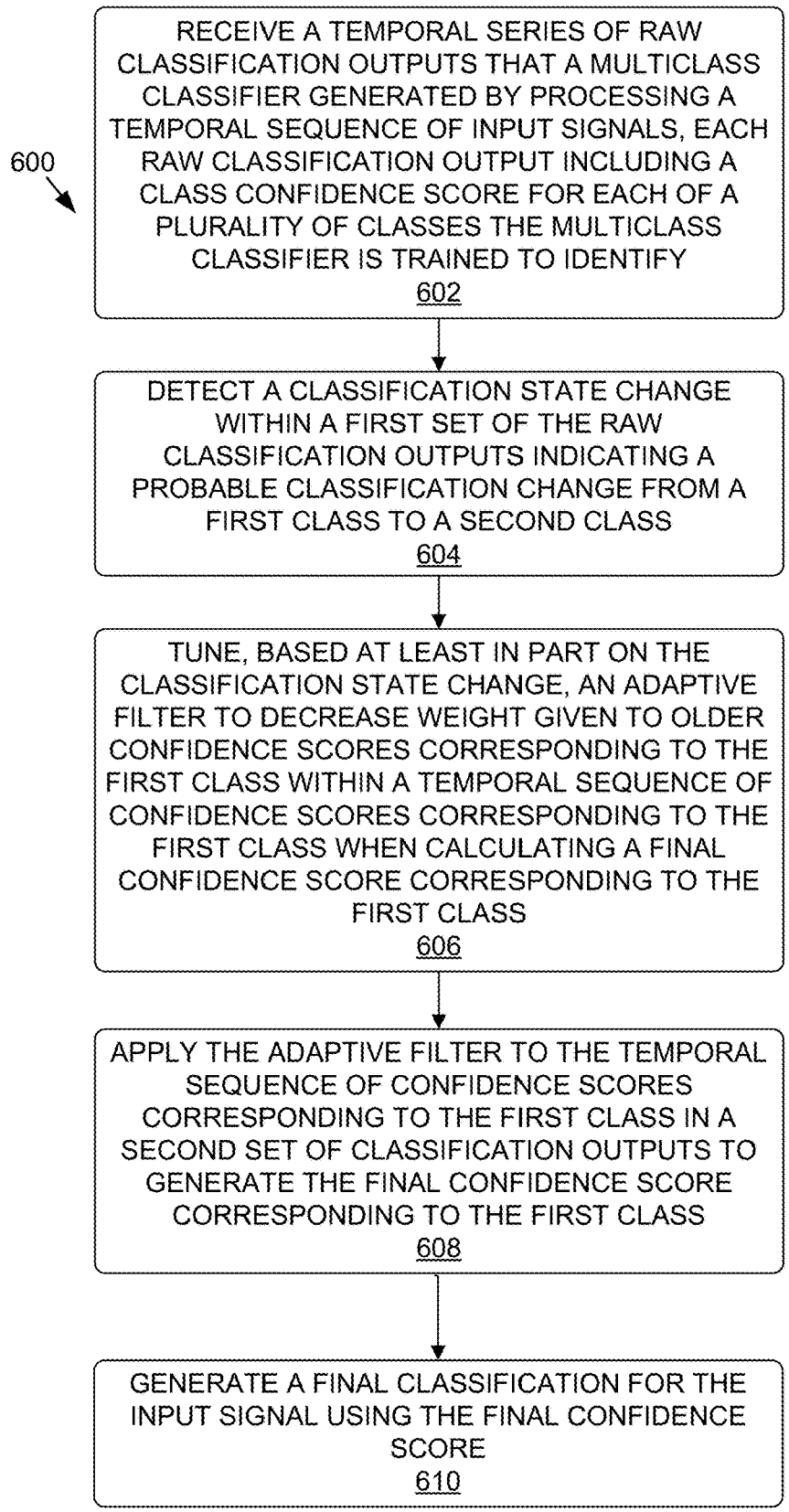
Figure 7:
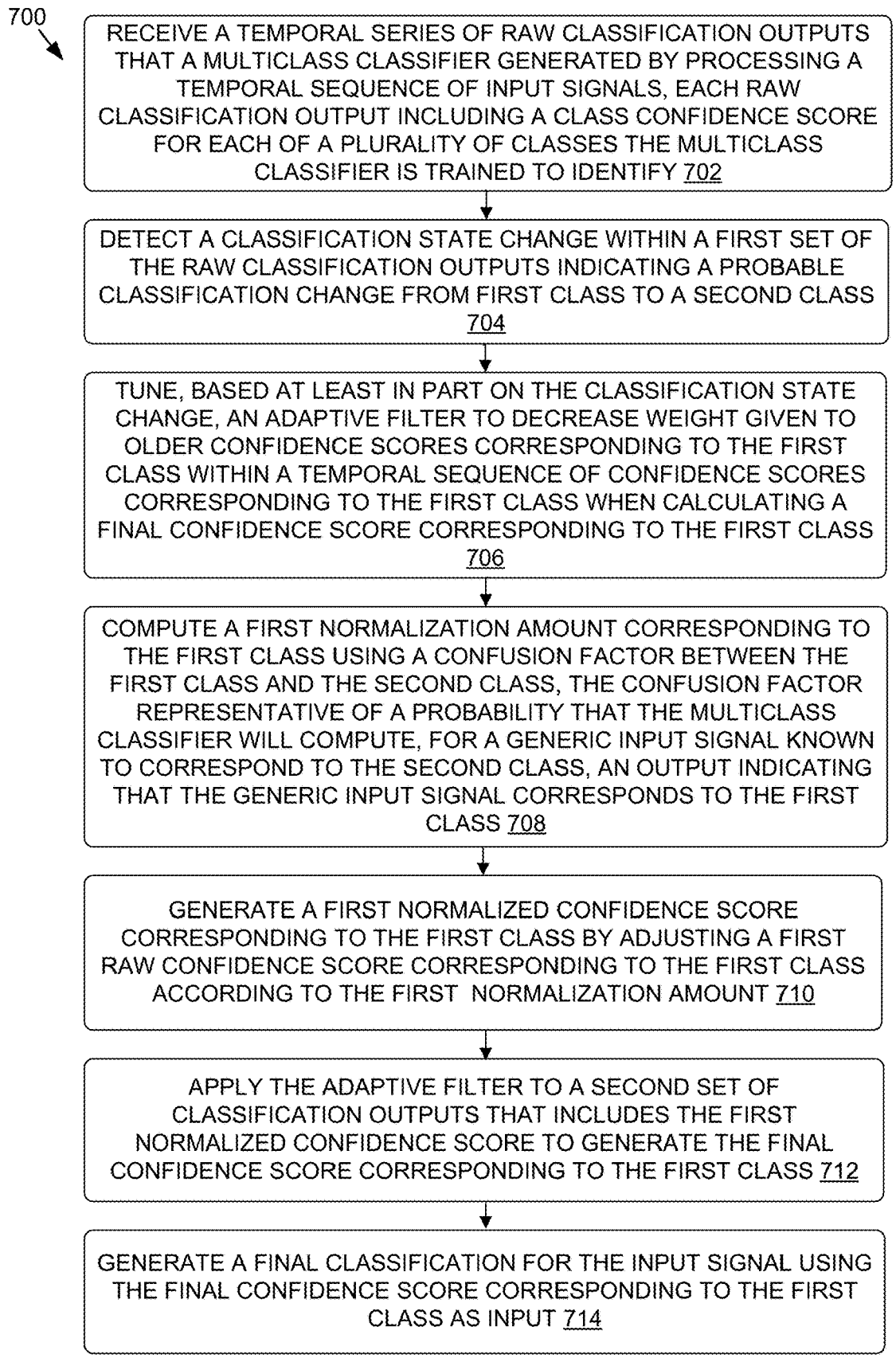

Now referring to FIGS. 5-7, each block of methods 500-700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 500-700 are described, by way of example, with respect to the real-time signal classification system 100 of FIG. 1. However, these methods may additionally or alternatively be executed by any one system, or any combination of systems, including, but not limited to, those described herein.

With reference to FIG. 5, FIG. 5 is a flow diagram showing a method 500 for assigning a classification to an input signal, in accordance with some embodiments of the present disclosure. The method 500, at block 502, includes receiving, based at least in part on a multiclass classifier processing the input signal, a raw classification output representative of a first raw confidence score, the first raw confidence score corresponding to a first class. The method 500, at block 504, includes computing a first normalization amount corresponding to the first class by using a confusion factor between the first class and a second class, the confusion factor representative of a probability that the multiclass classifier will compute, for a generic input signal known to correspond to the second class, an output indicating that the generic input signal corresponds to the first class. The method 500, at block 506, includes generating a first normalized confidence score corresponding to the first class by adjusting the first raw confidence score according to the first normalization amount. The method 500, at block 508, includes applying a temporal filter to the first normalized confidence score to generate a final confidence score corresponding to the first class. The method 500, at block 510, includes determining a final classification for the input signal based at least in part on the final confidence score corresponding to the first class.

Now referring to FIG. 6, FIG. 6 is a flow diagram showing a method 600 for assigning a classification to an input signal, in accordance with some embodiments of the present disclosure. The method 600, at block 602, includes receiving a temporal series of raw classification outputs that a multiclass classifier generated by processing a temporal sequence of input signals, each raw classification output including a class confidence score for each of a plurality of classes the multiclass classifier is trained to identify. The method 600, at block 604, includes detecting a classification state change within a first set of the raw classification outputs indicating a probable classification change from a first class to a second class. The method 600, at block 606, includes tuning, based at least in part on the classification state change, an adaptive filter to decrease weight given to older confidence scores corresponding to the first class within a temporal sequence of confidence scores corresponding to the first class when calculating a final confidence score corresponding to the first class. The method 600, at block 610, includes applying the adaptive filter to the temporal sequence of confidence scores corresponding to the first class in a second set of classification outputs to generate the final confidence score corresponding to the first class. The method 600, at block 612, includes generating a final classification for the input signal using the final confidence score.

With reference to FIG. 7, FIG. 7 is a flow diagram showing a method 700 for assigning a classification to an input signal, in accordance with some embodiments of the present disclosure. The method 700, at block 702, includes receiving a temporal series of raw classification outputs that a multiclass classifier generated by processing a temporal sequence of input signals, each raw classification output including a class confidence score for each of a plurality of classes the multiclass classifier is trained to identify. The method 700, at block 704, includes detecting a classification state change within a first set of the raw classification outputs indicating a probable classification change from first class to a second class. The method 700, at block 706, includes tuning, based at least in part on the classification state change, an adaptive filter to decrease weight given to older confidence scores corresponding to the first class within a temporal sequence of confidence scores corresponding to the first class when calculating a final confidence score corresponding to the first class. The method 700, at block 708, includes computing a first normalization amount corresponding to the first class using a confusion factor between the first class and the second class, the confusion factor representative of a probability that the multiclass classifier will compute, for a generic input signal known to correspond to the second class, an output indicating that the generic input signal corresponds to the first class. The method 700, at block 710, includes generating a first normalized confidence score corresponding to the first class by adjusting a first raw confidence score corresponding to the first class according to the first normalization amount. The method 700, at block 712, includes applying the adaptive filter to a second set of classification outputs that includes the first normalized confidence score to generate the final confidence score corresponding to the first class.

The method 700, at block 714, includes generating a final classification for the input signal using the final confidence score corresponding to the first class as input.

Example Machine Learning Models

Although examples are described herein with respect to using DNNs, and specifically CNNs, as for example CNN 110, this is not intended to be limiting. For example, and without limitation, the DNNs described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In addition, in some embodiments, the DNNs described herein may include a convolutional layer structure, including layers such as those described herein. For example, the DNNs may include a full architecture formulated for the task of generating various outputs-such as classification confidences. Where a CNN is implemented, one or more of the layers may include an input layer. The input layer may hold values associated with the input (e.g., vectors, tensors, etc. corresponding to sensor data, voxelized sensor data, feature vectors, etc.). For example, when the sensor data is an image(s), the input layer may hold values representative of the raw pixel values of the image(s) as a volume (e.g., a width, W, a height, H, and color channels, C (e.g., RGB), such as 32×32×3), and/or a batch size, B (e.g., where batching is used)

One or more layers of the DNNs may include 2D and/or 3D convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the DNNs may not include any pooling layers. In such examples, strided convolution layers may be used in place of pooling layers. In some examples, the feature extractor layer(s) may include alternating convolutional layers and pooling layers.

One or more of the layers may include a fully connected layer. Each neuron in the fully connected layer(s) may be connected to each of the neurons in the previous volume. The fully connected layer may compute class scores, and the resulting volume may be 1×1×number of classes. In some example, no fully connected layers may be used by the DNNs as a whole, in an effort to increase processing times and reduce computing resource requirements. In such examples, where no fully connected layers are used, the DNNs may be referred to as a fully convolutional network.

One or more of the layers may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input vector or tensor of the DNN, or used to up-sample to the input spatial resolution of a next layer.

Although input layers, convolutional layers, pooling layers, ReLU layers, deconvolutional layers, and fully connected layers are discussed herein with respect to the DNN, this is not intended to be limiting. For example, additional or alternative layers may be used, such as normalization layers, SoftMax layers, and/or other layer types.

Different orders and numbers of the layers of the DNNs may be used depending on the embodiment. In addition, some of the layers may include parameters (e.g., weights and/or biases), while others may not, such as the ReLU layers and pooling layers, for example. In some examples, the parameters may be learned by the DNNs during training. Further, some of the layers may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

Example Autonomous Vehicle

Figure 8A:
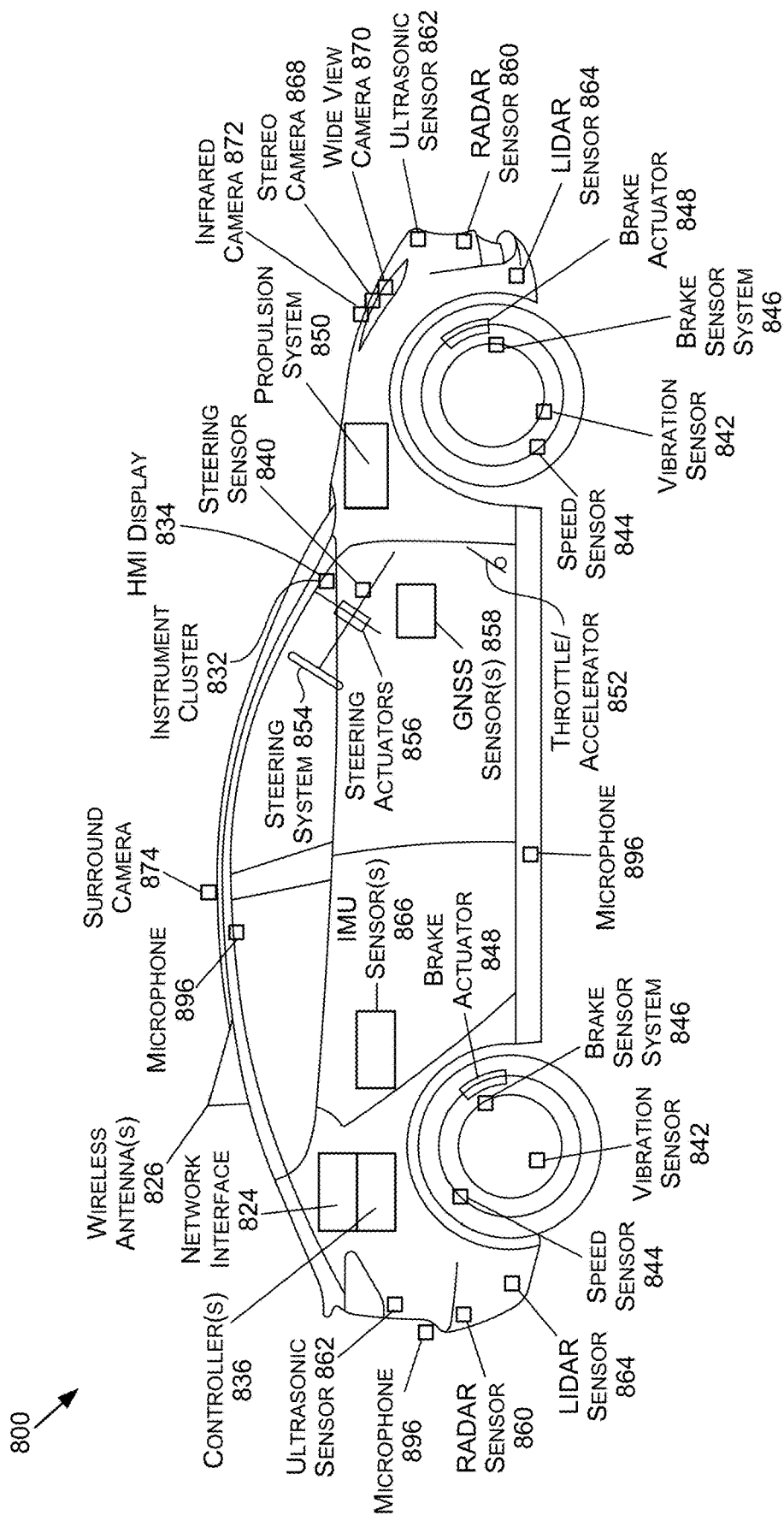
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The sensor signals may include video signals. Processing the signals may include assigning a classification to the video content using a multiclass classifier, such as classifier 108. The output from the classifier 108 may be adjusted using a temporal filter, such as temporal filter 130. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.). Objects may be identified using a multiclass classifier, such as classifier 108. The output from the classifier 108 may be tuned using a temporal filter, such as temporal filter 130.

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
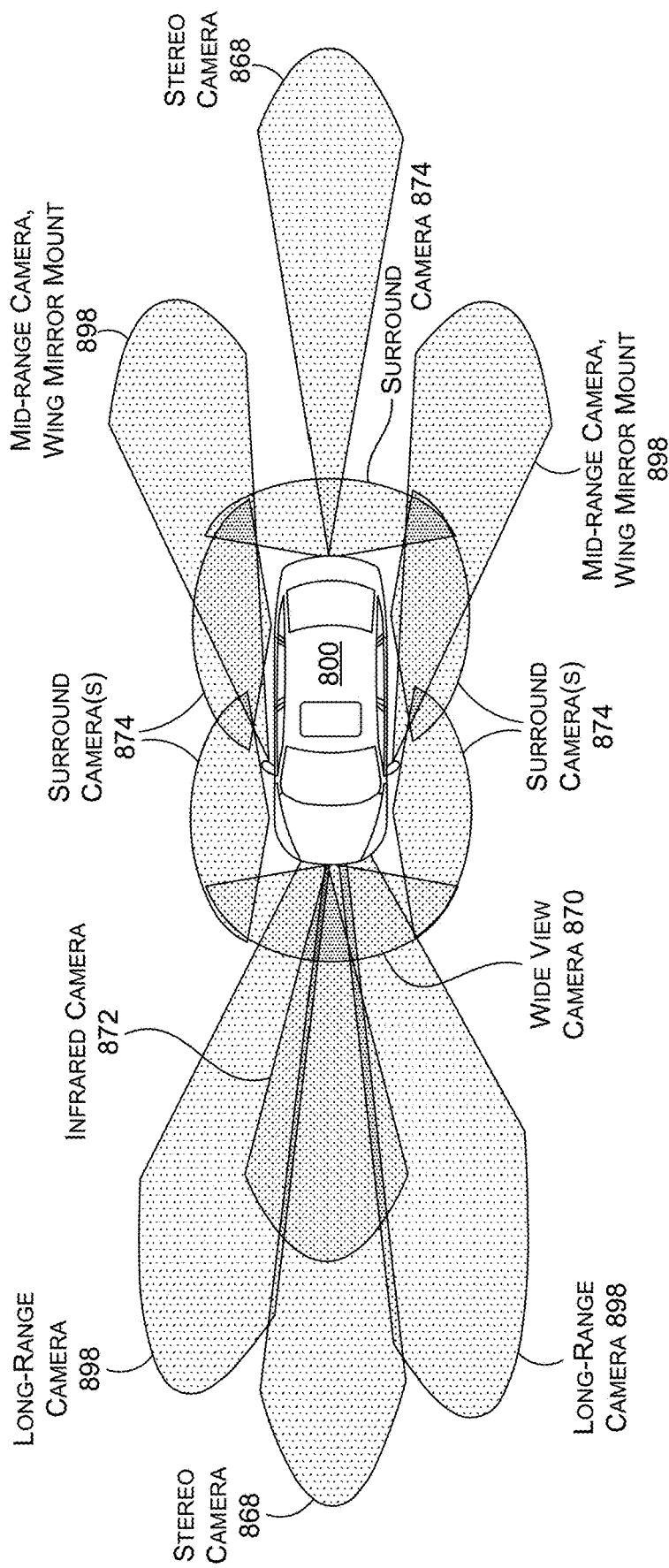
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 820 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle

800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
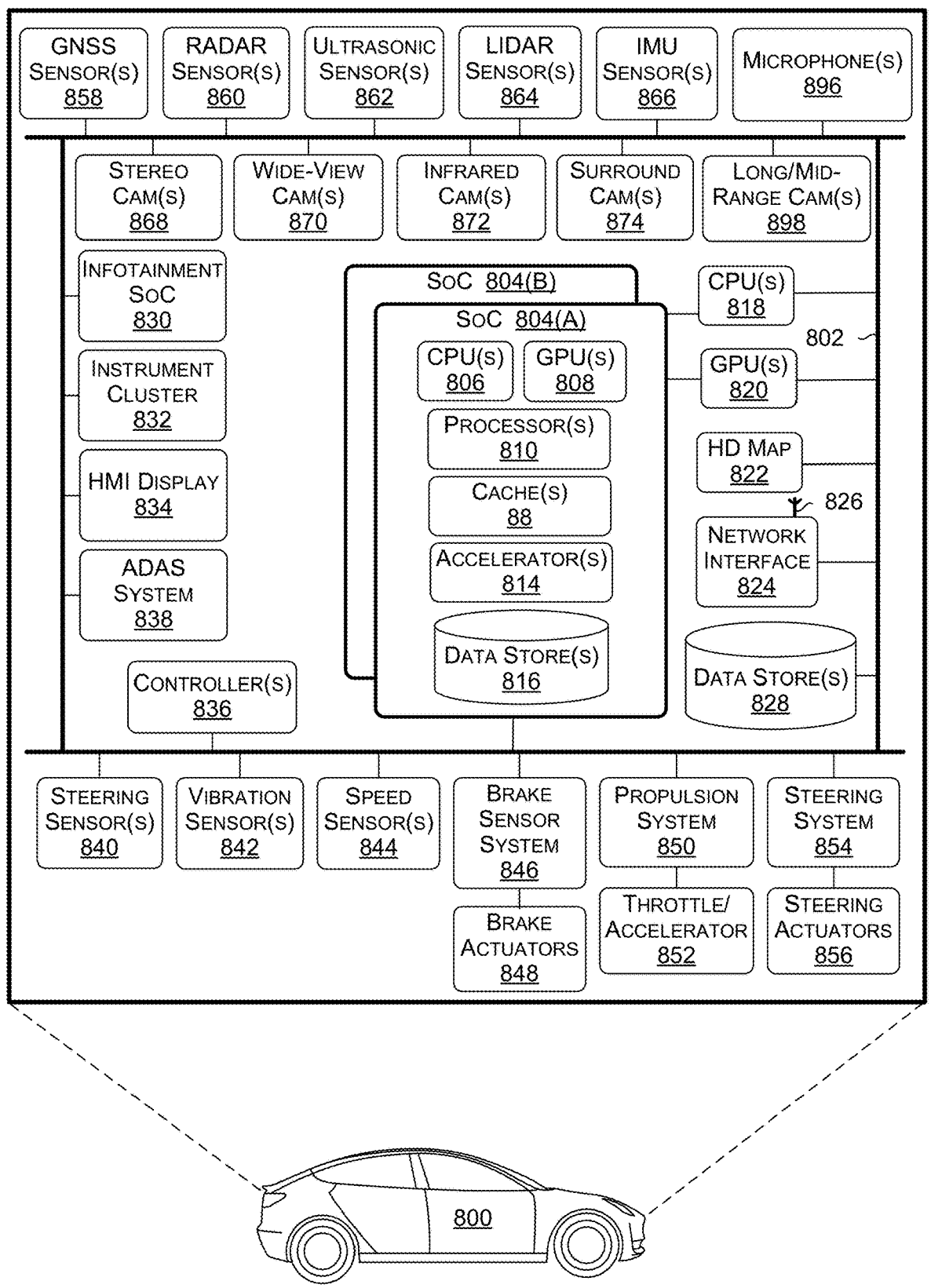
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like. The controllers may include a multiclass classifier, such as classifier 108, and/or use the output of such a classifier. The output from the classifier 108 may be tuned using a temporal filter, such as temporal filter 130.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection). A multiclass classifier, such as classifier 108, may include a CNN. The output from the classifier 108 may be tuned using a temporal filter, such as temporal filter 130.

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Object detection may use a multiclass classifier, such as classifier 108. The output from the classifier 108 may be tuned using a temporal filter, such as temporal filter 130. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS and/or assisted GPS sensors), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 820-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
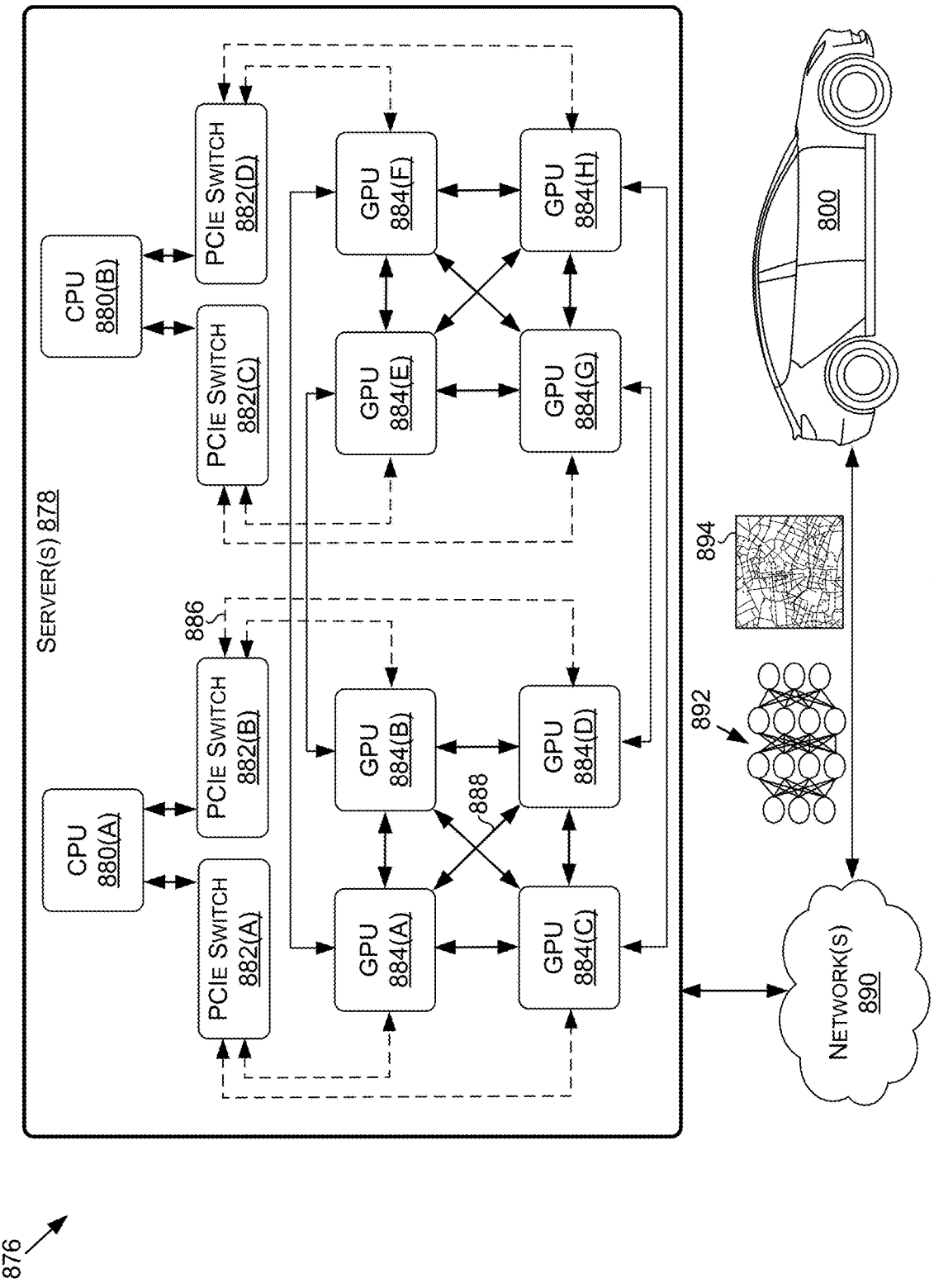
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
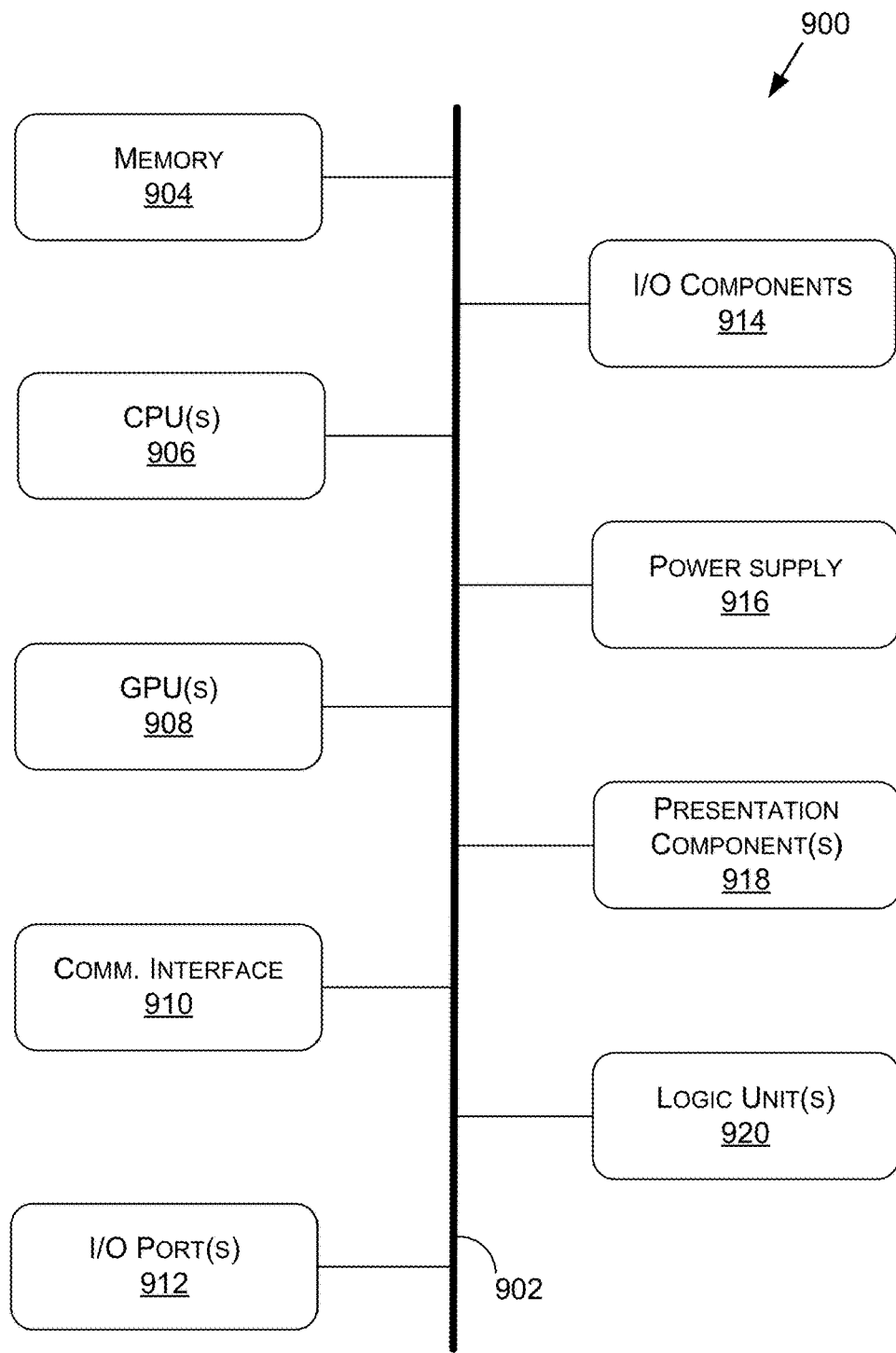
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
 determining, using one or more neural networks and based at least on sensor data obtained using one or more sensors of a machine, a temporal series of classification outputs;
 generating one or more filtered classification outputs based at least on applying a filter to one or more outputs of the temporal series of classification outputs;
 determining one or more confidence scores for one or more frames of the sensor data using the one or more filtered classification outputs; and
 performing one or more operations associated with the machine based at least on the one or more confidence scores.

2. The method of claim 1, wherein the one or more confidence scores are indicative of one or more probabilities that the one or more frames of the sensor data correspond to one or more classes of a group of classes.

3. The method of claim 1, further comprising classifying the one or more frames of the sensor data based at least on the one or more confidence scores, wherein the performing of the one or more operations associated with the machine is further based at least on the classifying of the one or more frames.

4. The method of claim 1, wherein the applying the filter comprises weighting the one or more outputs of the temporal series of classification outputs based at least on at least one of:
a recency of at least one output of the temporal series of classification outputs;
one or more classes being assigned to one or more second frames of the sensor data; or
detecting a classification state change using the temporal series of classification outputs.

5. The method of claim 1, further comprising:
processing the sensor data to generate a temporal series of input signals; and
applying one or more input signals of the temporal series of input signals to the one or more neural networks,
wherein the one or more neural networks determine the temporal series of classification outputs based at least on the applying.

6. The method of claim 1, wherein the sensor data includes at least one of a stream of image data, a stream of LiDAR data, or a stream of RADAR data.

7. A system comprising:
one or more processors to:
generate, based at least on temporally filtering classification outputs computed based at least on one or more machine learning models processing sensor data, one or more filtered classification outputs;
classify one or more frames of the sensor data based at least on one or more confidence scores computed for the one or more frames using the one or more filtered classification outputs; and
cause a machine to perform one or more operations based at least on the classification of the one or more frames.

8. The system of claim 7, wherein the temporally filtering the classification outputs to generate the one or more filtered classification outputs comprises weighting one or more of the classification outputs based on at least one of:
a recency of at least one of the classification outputs;
one or more classifications assigned to one or more second frames of the sensor data; or
detecting a classification state change using the classification outputs.

9. The system of claim 7, wherein the sensor data comprises a stream of sensor data.

10. The system of claim 9, wherein the stream of sensor data comprises at least one of:
a stream of image data generated using one or more image sensors of the machine;
a stream of LiDAR data generated using one or more LiDAR sensors of the machine;
a stream of RADAR data generated using one or more RADAR sensors of the machine; or
a stream of ultrasonic data generated using one or more ultrasonic sensors of the machine.

11. The system of claim 7, wherein the classification outputs are part of a temporal series of classification outputs determined based at least on applying a temporal series of frames of the sensor data to the one or more machine learning models.

12. The system of claim 7, the one or more processors further to:
apply the sensor data to the one or more machine learning models; and
obtain the classification outputs from the one or more machine learning models based at least on the application of the sensor data.

13. The system of claim 7, wherein the one or more machine learning models include one or more neural networks.

14. The system of claim 7, the one or more processors further to generate the sensor data using one or more sensors of the machine.

15. The system of claim 7, wherein the one or more confidence scores are indicative of one or more probabilities that the one or more frames of the sensor data correspond to one or more classifications of a group of classifications.

16. The system of claim 7, wherein the system is comprised in at least one of:
a control system for an autonomous or semi-autonomous machine;
a perception system for the autonomous or semi-autonomous machine;
a system for performing simulation operations;
a system for performing deep learning operations;
a system implemented using an edge device;
a system implemented using a robot;
a gaming system;
a system incorporating one or more virtual machines (VMs);
a system implemented at least partially in a data center; or
a system implemented at least partially using cloud computing resources.

17. One or more processors comprising:
processing circuitry to determine one or more control operations to perform using a virtual machine in a simulation environment based at least on temporally filtering one or more classification outputs computed based at least on one or more machine learning models processing one or more frames of simulated sensor data applied to the one or more machine learning models.

18. The one or more processors of claim 17, the processing circuitry further to classify, during the simulation, a second frame of the simulated sensor data based at least on the temporally filtering the one or more classification outputs, wherein the determination of the one or more control operations is further based at least on the classification.

19. The one or more processors of claim 18, the processing circuitry further to determine one or more confidence scores associated with the one or more classification outputs subsequent to the temporally filtering, wherein the classification of the second frame of the simulated sensor data is based at least on the one or more confidence scores.

20. The one or more processors of claim 17, wherein the simulation environment is generated using one or more ray-tracing operations.

* * * * *